Patented Nov. 17, 1925.

1,561,560

UNITED STATES PATENT OFFICE.

BERTRAM MAYER, OF BASEL, AND JAKOB WÜRGLER, OF NEUEWELT, NEAR BASEL, SWITZERLAND, ASSIGNORS TO THE SOCIETY OF CHEMICAL INDUSTRY IN BASLE, OF BASEL, SWITZERLAND.

INDIGOID DYESTUFFS.

No Drawing. Application filed January 4, 1924. Serial No. 684,449.

*To all whom it may concern:*

Be it known that we, BERTRAM MAYER and JAKOB WÜRGLER, both citizens of the Swiss Republic, and residing, the former at Basel, Switzerland, and the latter at Neuewelt, near Basel, Switzerland, have invented new and useful Indigoid Dyestuffs, of which the following is a full, clear, and exact specification.

This invention relates to new indigoid dyestuffs. It comprises the new dyestuffs, the process of making same, as well as the materials dyed with the new dyestuffs.

In our Patents 1,527,894 Feb 24, 1925 and 1,534,535 Apr. 21, 1925, new thioglycol-o-carboxylic acids have been described corresponding most probably to the general formula:

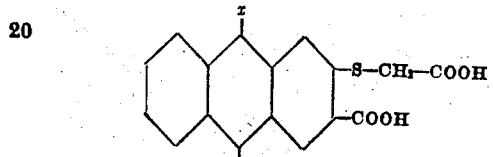

(wherein $x$ may stand for a hydrogen atom or an oxygen atom). These thioglycol-o-carboxylic acids may be condensed to the corresponding oxythionaphthene derivatives having probably the general formula:

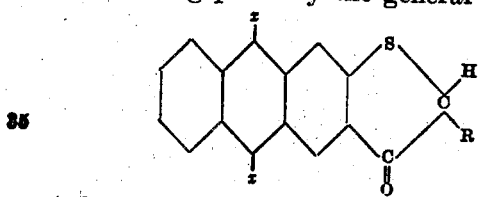

(wherein $x$ may stand for a hydrogen atom or an oxygen atom, and R for a hydrogen atom, an acidyl group or a carboxyl group) for instance by treating them with acetic anhydride and sodium acetate, or by heating them in presence of a suitable solvent.

It has now been found that valuable new indigoid dyestuffs are obtained by reacting on the oxythionaphthene derivatives and the corresponding thioglycol-o-carboxylic acids above referred to with compounds having the general formula:

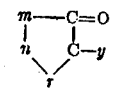

wherein $y$ represents a reactive group such as O, halogen, anil, 2H, and $m$, $n$ and $r$ atoms of which two are carbon atoms adjacent to each other which at the same time appertain to an aromatic ring system, and of which the third is $NH_2-S-$ or C.

Such compounds are for instance five-membered condensed ring systems, such as isatins, indoxyls, thioisatins, thioindoxyls or oxythionaphthenes of the benzene, naphthalene, anthracene and anthraquinone series, acenaphthenequinones, and the like, their homologues and substitution products, anils and halides.

This reaction takes place by heating the components in a solvent which may act as a condensing agent, in certain cases by addition of oxidizing agents.

Also in that case where thioglycol-o-carboxylic acid has been employed as a starting material the formation of dyestuff does only occur after oxythionaphthene has previously been formed.

The dyestuffs thus obtained correspond to the general formula:

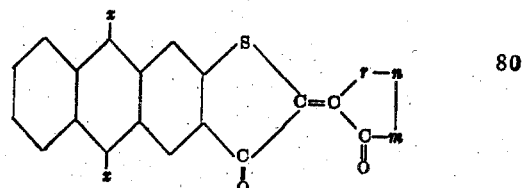

wherein $x$, $r$, $m$ and $n$ have the significations as has hereinbefore been defined. They form red to green and black powders, which dissolve in concentrated sulphuric acid to orange-red to green and brown solutions, yielding with hydrosulphite and caustic soda solution orange-brown to green vats which dye cotton fast blue-red to green and grey tints.

These dyestuffs may further be converted into the corresponding halogenated dyestuffs by subsequent halogenation.

The following examples illustrate the invention but without limiting it; the parts being by weight.

*Example 1.*

1 part of anthraquinone-2-thioglycol-3-carboxylic acid is cautiously heated with 0.2 part of anhydrous sodium acetate in 5 parts of acetic anhydride until evolution of carbon dioxide has ceased. The acetic anhydride is then distilled in a vacuum, the residue is poured into water, the water is boiled and the acetyl compound of anthraquinone-2:3-oxythionaphthene which has separated in yellow flocks is filtered. This acetyl derivative is then saponified by heating it with alkali in water or alcohol, whereby the yellow acetyl compound becomes anthraquinone-2:3-oxythionaphthene. The latter is a deep blue powder which passes towards orange on addition of an acid. It is soluble to a brownish-yellow solution in hot nitrobenzene and to a blue-red solution in sulphuric acid, from which latter solution it is precipitated in the form of orange flocks by addition of water. With hydrosulphite and caustic soda solution it yields an olive vat having a luminous blue fluorescence, but the reduced dyestuff has only slight affinity for vegetable fibres.

*Example 2.*

1 part of anthracene-2-thioglycol-3-carboxylic acid is cautiously heated with 0.2 part of anhydrous sodium acetate in 5 parts of acetic anhydride until evolution of carbon dioxide has ceased. The acetic anhydride is then distilled in a vacuum, the residue is poured into water and the mixture is boiled and filtered to collect the clear yellow flocks of the acetyl-compound of anthracene-2:3-oxythionaphthene. This acetyl derivative is saponified by heating it with alkali in aqueous or alcoholic suspension or solution. The anthracene-2:3-oxythionaphthene thus formed is a clear brown powder which dissolves in sulphuric acid at first to a red and then to a brown solution. On addition of water it is re-precipitated in the form of brown flocks.

*Example 3.*

10 parts of anthracene 2-thioglycol-3-carboxylic acid are suspended in 100 parts of water and heated in a closed vessel for several hours at 160–170° C. After cooling the product of the reaction which has been formed is filtered, the solid matter being boiled with dilute sodium carbonate solution, again filtered, washed and dried. It constitutes the anthracene-2:3-oxythionaphthene which has been formed in an excellent yield by internal condensation and ring closure.

*Example 4.*

35 parts of anthraquinone-2-thioglycol-3-carboxylic acid are heated with 500 parts of water in a closed vessel for several hours at 190–200° C. The anthraquinone-2:3-bis-thionaphthene indigo is thus produced by ring closure and oxidation at the cost of a part of the parent material, the solid matter, after cooling, being filtered, boiled out with soda solution, again filtered, abundantly washed and dried.

The anthraquinone-2:3-bis-thionaphthene-indigo corresponding with the following formula:

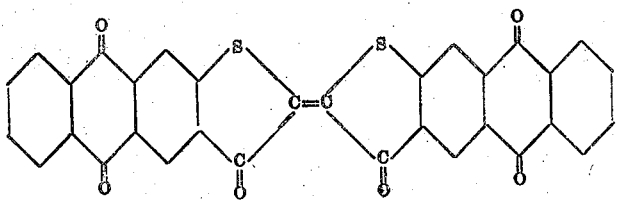

is a deep green-black powder which dissolves in sulphuric acid to a green solution and forms with hydrosulphite and caustic soda solution an olive-brown vat which dyes cotton blue tints.

When 2-chloro-anthraquinone-3-carboxylic acid is heated together with thioglycolic acid at a higher temperature a similar dyestuff is obtained.

*Example 5.*

28 parts of anthraquinone-2:3-oxythionaphthene are suspended in 1000 parts of water, 100 parts of caustic soda solution are added and the mixture heated at 100° C. while gradually adding about 50 parts of ammonium persulphate until the halo of a dab-test is no more violet but almost colorless. The anthraquinone-2:3-bis-thionaphthene indigo which has been formed is filtered, washed and dried.

*Example 6.*

10 parts of anthracene-2:3-oxythionaphthene are suspended in 5 parts of nitrobenzene and heated to the boiling point. After cooling the crystalline anthracene-2:3-bis-thionaphthene indigo which has separated is filtered, washed with alcohol, and dried.

The anthracene-2:3-bis-thionaphthene indigo forms a green powder which dissolves in sulphuric acid to an olive solution, yielding with hydrosulphite and caustic soda solution a brown vat from which cotton is dyed green tints.

Example 7.

35 parts of anthraquinone-2-thioglycol-3-carboxylic acid are mixed with 25 parts of α-isatin-anilide, 10 parts of anhydrous sodium acetate and 300 parts of acetic anhydride and the mixture is boiled in a reflux apparatus for several hours. An unsymmetrical vat dyestuff corresponding with the following formula:

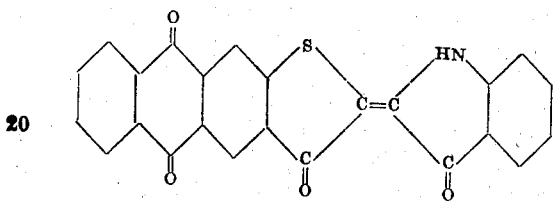

is thus produced which separates in the form of a blue crystalline powder. After cooling the mixture is filtered and the dyestuff washed with glacial acetic acid and water.

It dissolves in sulphuric acid to a green solution from which water precipitates it in the form of blue flocks. It forms with hydrosulphite and caustic soda solution an olive brown vat which dyes cotton full, fast blue tints.

By substituting for the α-isatin-anilide the equivalent quantity of β-naphthisatin-naphthalide (obtained from β-naphthylamine by Sandmeyer's process) there is obtained a dyestuff corresponding with the general formula:

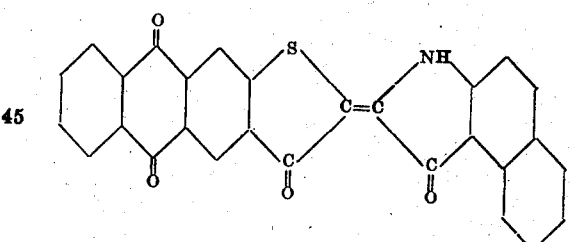

which dyes cotton violetish-grey in a brown-olive vat. Instead of the anthraquinone-2-thioglycol-3-carboxylic acid used in this example, the anthraquinone-2:3-oxythionaphthene can be condensed with isatin-anilide or another α-substituted isatin derivative.

Example 8.

35 parts of anthraquinone-2-thioglycol-3-carboxylic acid, 22 parts of acenaphthenequinone and 30 parts of acetic anhydride are boiled together with 300 parts of nitrobenzene for several hours in a reflux apparatus. After cooling, the product is filtered, washed with alcohol and water, and dried. The new dyestuff corresponding with the general formula:

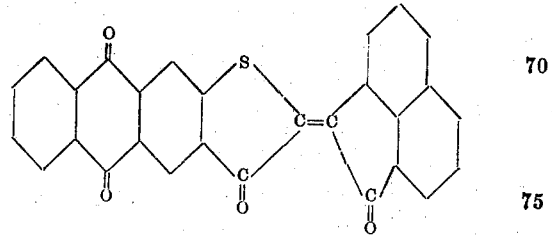

is a red crystalline powder which dissolves in sulphuric acid to a blue solution from which water precipitates brown red flocks. In hydrosulphite and caustic soda solution it yields a brown vat which dyes cotton bluish Bordeaux tints.

Example 9.

32 parts of anthracene-2-thioglycol-3-carboxylic acid are mixed with 25 parts of α-isatinanilide, 150 parts of acetic anhydride and 10 parts of anhydrous sodium acetate and the mixture is boiled for some hours in a reflux apparatus. After cooling the condensation product which has been formed is filtered, washed with glacial acetic acid and water, and dried.

The new dyestuff corresponding with the following formula:

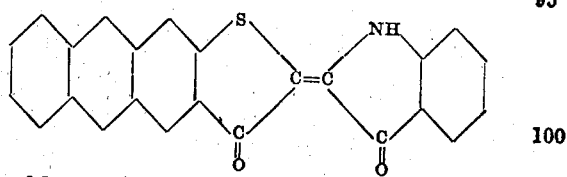

is a black green powder soluble in sulphuric acid to a brown solution from which water precipitates it in the form of green flocks. With hydrosulphite and caustic soda solution it yields a violet brown vat which dyes cotton pure green tints of surprising fastness.

If 20 parts of isatin be substituted for the 25 parts of α-isatinanilide, a dyestuff is produced which is a blue-grey powder soluble in sulphuric acid to a red brown solution, from which it is precipitated by adding water in the form of grey green flocks. With hydrosulphite and caustic soda solution it yields a brown vat which dyes cotton valuable very fast grey tints.

Example 10.

26 parts of anthracene-2:3-oxythionaphthene are heated with 25 parts of α-isatinanilide in 300 parts of pyridine. The formation of dyestuff is soon ended. The green dyestuff formed which is identical with that of the preceding example is filtered, washed with alcohol and dried.

Example 11.

82 parts of the dyestuff made in accordance with Example 7 from anthraquinone-2- thioglycol-3-carboxylic acid and α-isatinanilide are mixed with 1600 parts of nitrobenzene and the mixture is gradually heated to the boiling point with 66 parts of bromine and then boiled for an hour in a reflux apparatus.

After cooling, the mixture is filtered, washed with alcohol and dried. The new dyestuff is a blue violet crystalline powder, which dissolves in sulphuric acid to a green solution and yields with hydrosulphite and caustic soda solution a brown olive vat which dyes cotton blue tints somewhat greener than those produced by the non-brominated dyestuff.

*Example 12.*

82 parts of the dyestuff from anthraquinone-2-thioglycol-3-carboxylic acid and α-isatinanilide are dissolved at 0° C. in 800 parts of chlorosulphonic acid, and the solution is mixed at 0° C. with 66 parts of bromine, whereupon it is stirred for an hour at ordinary temperature and then poured into ice water. The brominated dyestuff corresponding probably with the general formula:

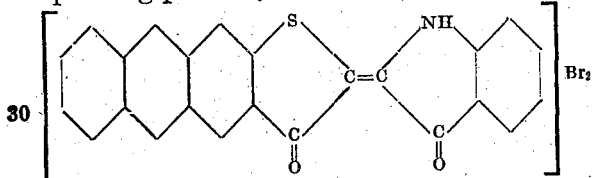

which has properties similar to those of the product of Example 11 is filtered, washed neutral and dried.

*Example 13.*

76 parts of the dyestuff from anthracene-2-thioglycol-3-carboxylic acid and α-isatinanilide are mixed in 1500 parts of nitrobenzene with 66 parts of bromine; the mixture is heated in the course of an hour to the boiling point and then boiled gently for an hour in a reflux apparatus. After cooling, the bromination product is filtered, washed with alcohol and dried. It is a grey green powder which dissolves in sulphuric acid to an olive solution, from which water precipitates it in the form of grey green flocks. With hydrosulphite and caustic soda solution it forms a green vat which dyes cotton yellow green.

The dyestuff from anthracene-2-thioglycol-3-carboxylic acid and isatin brominated in the same manner yields a product which is a grey green powder, soluble in sulphuric acid to an olive solution, and yielding with hydrosulphite and caustic soda solution an orange brown vat which dyes cotton grey green tints.

The following table shows some of the characteristic properties of a number of dyestuffs which can be made in accordance with this invention:

| Parent materials of the dyestuffs. | Colour of powder. | Colour of solution in H₂SO₄. | Colour of vat. | Dyeing on cotton. |
|---|---|---|---|---|
| I. Anthraquinone-2-thioglycol-3-carboxylic acid or anthraquinone-2:3-oxythionaphthene+α-isatin anilide. | Blue | Green | Brown-olive | Blue. |
| II. Idem+α-isatin anilide and bromination | Blue-violet | Blue-green | Brown-olive | Blue. |
| III. Idem+β-naphthisatin-β-naphthalide | Grey-blue | Green-blue | Brown-olive | Violetish grey. |
| IV. Idem+isatin | Light red | Dull violet blue | Yellow-brown | Bordeaux. |
| V. Idem+isatin and bromination | Red | Dull violet red | Yellow-brown | Bordeaux. |
| VI. Idem+dibromoisatin | Red | Violet | Yellow-brown | Blue-red. |
| VII. Idem+acenaphthenequinone | Red | Blue | Brown | Bluish bordeaux. |
| VIII. Anthraquinone-2-thioglycol-3-carboxylic acid or anthraquinone-2:3-oxythionaphthene + acenaphthenequinone and bromination. | Red | Blue | Brown | Bordeaux. |
| IX. Idem+thioisatin | Blue-red | Green | Olive | Heliotrope. |
| X. Idem+thionaphthisatin | Violet-brown | Blue-green | Brown-olive | Heliotrope. |
| XI. Idem+5:7-dibromoisatinchloride | Violet | Green | Olive-brown | Blue. |
| XII. Idem+7-chloroisatin chloride | Violet | Green | Olive-brown | Blue. |
| XIII. Idem+5:7-dimethylisatin chloride | Violet | Green | Olive-brown | Blue. |
| XIV. Idem+7-methylisatin chloride | Violet | Green | Olive-brown | Blue. |
| XV. Idem+4-chloro-4-methoxyisatinchloride | Violet | Blue-green | Olive | Greenish-blue. |
| XVI. Idem+4-methoxyisatin chloride | Violet | Blue-green | Olive | Greenish-blue. |
| XVII. Anthracene-2-thioglycol-3-carboxylic acid or anthracene-2:3-oxythionaphthene+α-isatin anilide. | Green-black | Brown | Violet-brown | Pure green. |
| XVIII. Idem+α-isatin anilide and bromination | Grey-green | Olive | Green | Yellow-green. |
| XIX. Idem+β-naphthisatin-β-naphthalide | Black-green | Green | Brown | Green. |
| XX. Anthracene-2-thioglycol-3-carboxylic acid or anthracene-2:3-oxythionaphthene+isatin. | Blue-grey | Red-brown | Brown | Blue-grey. |
| XXI. Idem+isatin and bromination | Grey-green | Olive | Orange-brown | Green-grey. |
| XXII. Idem+dibromoisatin | Black-green | Olive | Brown | Greenish-grey. |
| XXIII. Idem+thioisatin | Black-green | Yellow-brown | Orange-brown | Dull blue-green. |
| XXIV. Idem+β-thionaphthisatin | Dark green | Brown | Brown | Green. |
| XXV. Idem+β-naphthisatin | Dark green | Olive-green | Brown | Green. |
| XXVI. Idem+acenaphthenequinone | Brown-black | Orange-red | Blue-grey | Greenish-grey. |
| XXVII. Idem+1:4-naphthoquinone | Green | Blue-red | Yellow-brown | Green. |
| XXVIII. Idem+6-bromo-1:2-naphthoquinone | Green | Blue-red | Yellow-brown | Green. |
| XXIX. Idem+5:7-dibromoisatin chloride | Green-black | Olive-grey | Brown-olive | Green. |
| XXX. Idem+7-methylisatin-o-toluidide | Green-black | Brown | Grey-green | Green. |
| XXXI. Idem+β-naphthisatinchloride | Green-black | Brown | Grey | Green. |
| XXXII. Idem+α-naphthisatin-α-naphthalide | Green-black | Brown | Grey | Green |

The formula of the dyestuff XXIV is:

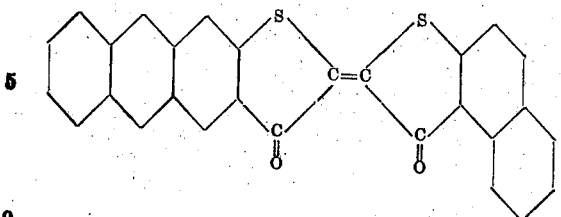

The formula of the dyestuff XXV is:

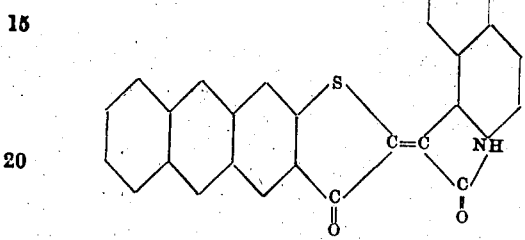

What we claim is:—

1. As new products of manufacture the herein described new indigoid dyestuffs of the general formula:

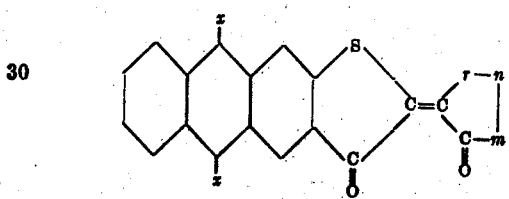

wherein $x$ represents a hydrogen atom or an oxygen atom, and $r$, $n$ and $m$ atoms of which two are carbon atoms adjacent to each other which at the same time appertain to an aromatic ring system, and of which the third is NH—, —S— or C, which products form red to green and green-black powders soluble in concentrated sulphuric acid to orange-red to green and brown solutions, yielding with hydrosulphite and caustic soda solution orange-brown to green vats which dye cotton fast blue-red to green and grey tints.

2. As new products of manufacture the herein described new indigoid dyestuffs of the general formula:

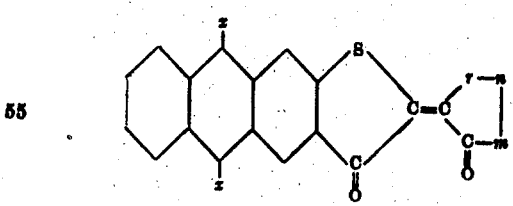

wherein $x$ represents a hydrogen atom or an oxygen atom, and $r$, $n$ and $m$ atoms of which two are carbon atoms adjacent to each other which at the same time appertain to an aromatic ring system, and of which the third is NH or S, which products form red to green and green-black powders soluble in concentrated sulphuric acid to orange-red to green and brown solutions, yielding with hydrosulphite and caustic soda solution orange-brown to green vats which dye cotton fast blue-red to green and grey tints.

3. As new products of manufacture the herein described new indigoid dyestuffs of the general formula:

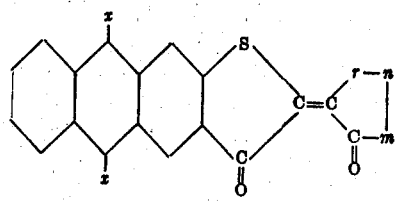

wherein $x$ represents a hydrogen atom or an oxygen atom, and $r$, $n$ and $m$ atoms of which two are carbon atoms adjacent to each other which at the same time appertain to a ring of the benzene series, and of which the third is NH or S, which products form red to green and green-black powders soluble in concentrated sulphuric acid to orange-red to green and brown solutions, yielding with hydrosulphite and caustic soda solution orange-brown to green vats which dye cotton fast blue-red to green and grey tints.

4. As new products of manufacture the herein described new indigoid dyestuffs of the general formula:

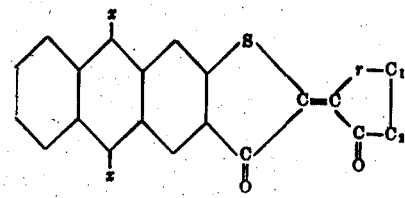

wherein $x$ represents a hydrogen atom or an oxygen atom, the atoms $C_1$ and $C_2$ appertaining to a ring of the benzene series, and $r$ is NH or S, which products form red to green and green-black powders soluble in concentrated sulphuric acid to orange-red to green and brown solutions, yielding with hydrosulphite and caustic soda solution orange-brown to green vats which dye cotton fast blue-red to green and grey tints.

5. As new products of manufacture the herein described new indigoid dyestuffs of the general formula:

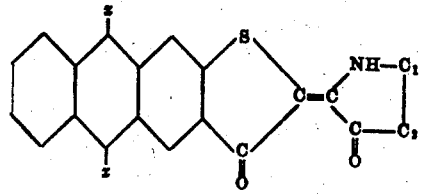

wherein $x$ represents a hydrogen atom or an oxygen atom, the atoms $C_1$ and $C_2$ appertaining to a ring of the benzene series, which products form red to green and green-black powders soluble in concentrated sulphuric acid to orange red to green and brown solutions, yielding with hydrosulphite and caustic soda solution orange-brown to green vats which dye cotton fast blue-red to green and grey tints.

6. As new products of manufacture the herein described indigoid dyestuffs of the general formula:

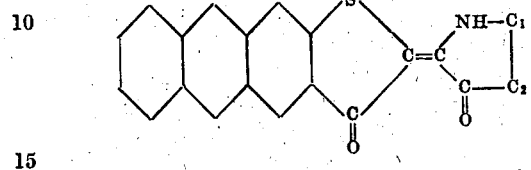

wherein the atoms $C_1$ and $C_2$ appertain to a ring of the benzene series, which products form brown-black to green-black powders soluble in concentrated sulphuric acid to orange-red to olive solutions, yielding with hydrosulphite and caustic soda solution orange-brown to green vats which dye cotton fast grey to green tints.

7. As a new product of manufacture the herein described new indigoid dyestuff having probably the formula:

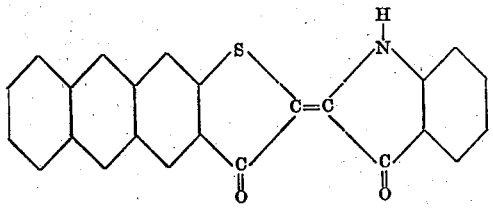

which forms a green-black powder soluble in concentrated sulphuric acid to a brown solution, yielding with hydrosulphite and caustic soda solution a violet-brown vat which dyes cotton fast green tints.

In witness whereof we have hereunto signed our names this 20th day of December, 1923.

BERTRAM MAYER.
JAKOB WÜRGLER.